(12) United States Patent
Line et al.

(10) Patent No.: US 10,220,752 B2
(45) Date of Patent: Mar. 5, 2019

(54) ADJUSTABLE HEADREST ASSEMBLY WITH NECK SUPPORT FEATURE

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Kevin Preuss, Berkley, MI (US); Christian J. Hosbach, Taylor, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 14/994,587

(22) Filed: Jan. 13, 2016

(65) Prior Publication Data

US 2017/0197530 A1    Jul. 13, 2017

(51) Int. Cl.
*B60N 2/809* (2018.01)
*B60N 2/838* (2018.01)
*B60N 2/888* (2018.01)
*B60N 2/885* (2018.01)

(52) U.S. Cl.
CPC ............ *B60N 2/838* (2018.02); *B60N 2/809* (2018.02); *B60N 2/885* (2018.02); *B60N 2/888* (2018.02)

(58) Field of Classification Search
None
See application file for complete search history.

(56) References Cited

U.S. PATENT DOCUMENTS

| 2,719,577 | A | * | 10/1955 | Eyman | A47C 7/383 297/391 |
| 4,796,953 | A | | 1/1989 | Pereira | |
| 5,108,150 | A | | 4/1992 | Stas et al. | |
| 5,586,810 | A | * | 12/1996 | Liu | A47C 7/38 128/845 |
| 6,220,668 | B1 | * | 4/2001 | Scheffzuck | B60N 2/4802 297/391 |
| 6,250,716 | B1 | * | 6/2001 | Clough | A47C 7/383 297/391 |
| 6,305,749 | B1 | * | 10/2001 | O'Connor | A47C 7/383 297/397 |
| 6,470,532 | B2 | * | 10/2002 | Rude | G06F 1/1616 16/313 |

(Continued)

*Primary Examiner* — Joshua J Michener
*Assistant Examiner* — Kyle J. Walraed-Sullivan
(74) *Attorney, Agent, or Firm* — Vichit Chea; Price Heneveld LLP

(57) ABSTRACT

A headrest assembly includes a front surface and a frame member disposed within an interior of the headrest bun. First and second hinge members are coupled to opposite sides of the frame member and first and second side supports are operably coupled to the first and second hinge members, such that the first and second side supports are independently operable between stowed and extended positions relative to the headrest bun. The first and second side supports extended outwardly from the front surface of the headrest bun in the extended position, and the friction hinges are tuned to move the first and second side supports towards the stowed position when the first and second side supports are contacted by a vehicle occupant during a vehicle impact event.

8 Claims, 7 Drawing Sheets

(56) References Cited

U.S. PATENT DOCUMENTS

| | | | | |
|---|---|---|---|---|
| 6,648,416 B2* | 11/2003 | O'Connor | A47C 7/383 | 297/397 |
| 8,033,603 B2 | 10/2011 | Meert | | |
| 2001/0026090 A1* | 10/2001 | Bartels | B60N 2/885 | 297/391 |
| 2002/0033628 A1* | 3/2002 | Clough | A47C 7/38 | 297/410 |
| 2002/0158499 A1* | 10/2002 | Clough | A47C 7/38 | 297/410 |
| 2004/0007910 A1* | 1/2004 | Skelly | A47C 7/38 | 297/406 |
| 2004/0195893 A1* | 10/2004 | Clough | A47C 7/38 | 297/391 |
| 2004/0217639 A1* | 11/2004 | Clough | A47C 7/38 | 297/391 |
| 2005/0121963 A1* | 6/2005 | Williamson | B60N 2/01508 | 297/408 |
| 2007/0057545 A1* | 3/2007 | Hartenstine | B60N 2/2851 | 297/250.1 |
| 2007/0057547 A1* | 3/2007 | Hartenstine | B60N 2/2806 | 297/256.13 |
| 2009/0322131 A1* | 12/2009 | Hartenstine | B60N 2/2821 | 297/256.11 |
| 2010/0123344 A1* | 5/2010 | Villeminey | B60N 2/487 | 297/391 |
| 2012/0292973 A1* | 11/2012 | Westerink | B64D 11/06 | 297/391 |
| 2012/0299356 A1* | 11/2012 | Edwards | B60N 2/4879 | 297/397 |
| 2013/0221722 A1* | 8/2013 | Navarro | B60N 2/4882 | 297/391 |
| 2013/0234490 A1* | 9/2013 | Millan | B60N 2/4808 | 297/391 |
| 2014/0300168 A1* | 10/2014 | Szczygiel | B60N 2/4882 | 297/391 |
| 2016/0046219 A1* | 2/2016 | Schauf | B60N 2/4882 | 297/391 |
| 2016/0214513 A1* | 7/2016 | Millan | B60N 2/4882 | |
| 2016/0339817 A1* | 11/2016 | Mizobata | B60N 2/4805 | |

* cited by examiner

ADJUSTABLE HEADREST ASSEMBLY WITH NECK SUPPORT FEATURE

FIELD OF THE INVENTION

The present invention generally relates to a headrest assembly for a vehicle seat, and more particularly, to a headrest assembly that is adjustable to provide enhanced comfort and neck support to a vehicle occupant.

BACKGROUND OF THE INVENTION

Headrests are often disposed on a seatback of a vehicle seat and can be uncomfortable, particularly when the headrest is not adjustable to suit the needs of a particular vehicle occupant. For tired passengers, long trips can leave a vehicle occupant with aches and pains associated with sleeping with their head disposed at an awkward angle. Thus, a headrest assembly is desired that provides adjustable neck support for a vehicle occupant that is easily deployed and configured to revert to a stowed condition under particular force thresholds.

SUMMARY OF THE INVENTION

One aspect of the present invention includes a vehicle seat having a seatback that is coupled to a seat portion. A headrest assembly is supported from the seatback and operable between first and second configurations. The headrest assembly includes a headrest bun having a lower portion and first and second side supports adjustably coupled to the headrest bun and operable between stowed and extended positions.

Another aspect of the present invention includes a headrest assembly having an internal frame member and a friction hinge coupled to the internal frame member at a first portion thereof. A side support is coupled to a second portion of the friction hinge, such that the side support is pivotally coupled to the headrest bun and operable between stowed and extended positions. The side support is configured to move from the extended position towards the stowed position when contacted by a vehicle occupant during a vehicle impact event.

Yet another aspect of the present invention includes a headrest assembly having a front surface and a frame member disposed within an interior of the headrest bun. First and second hinge members are coupled to opposite sides of the frame member and first and second side supports are operably coupled to the first and second hinge members, such that the first and second side supports are independently operable between stowed and extended positions relative to the headrest bun. The first and second side supports extended outwardly from the front surface of the headrest bun in the extended position, and the friction hinges are tuned to move the first and second side supports towards the stowed position when the first and second side supports are contacted by a vehicle occupant during a vehicle impact event.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
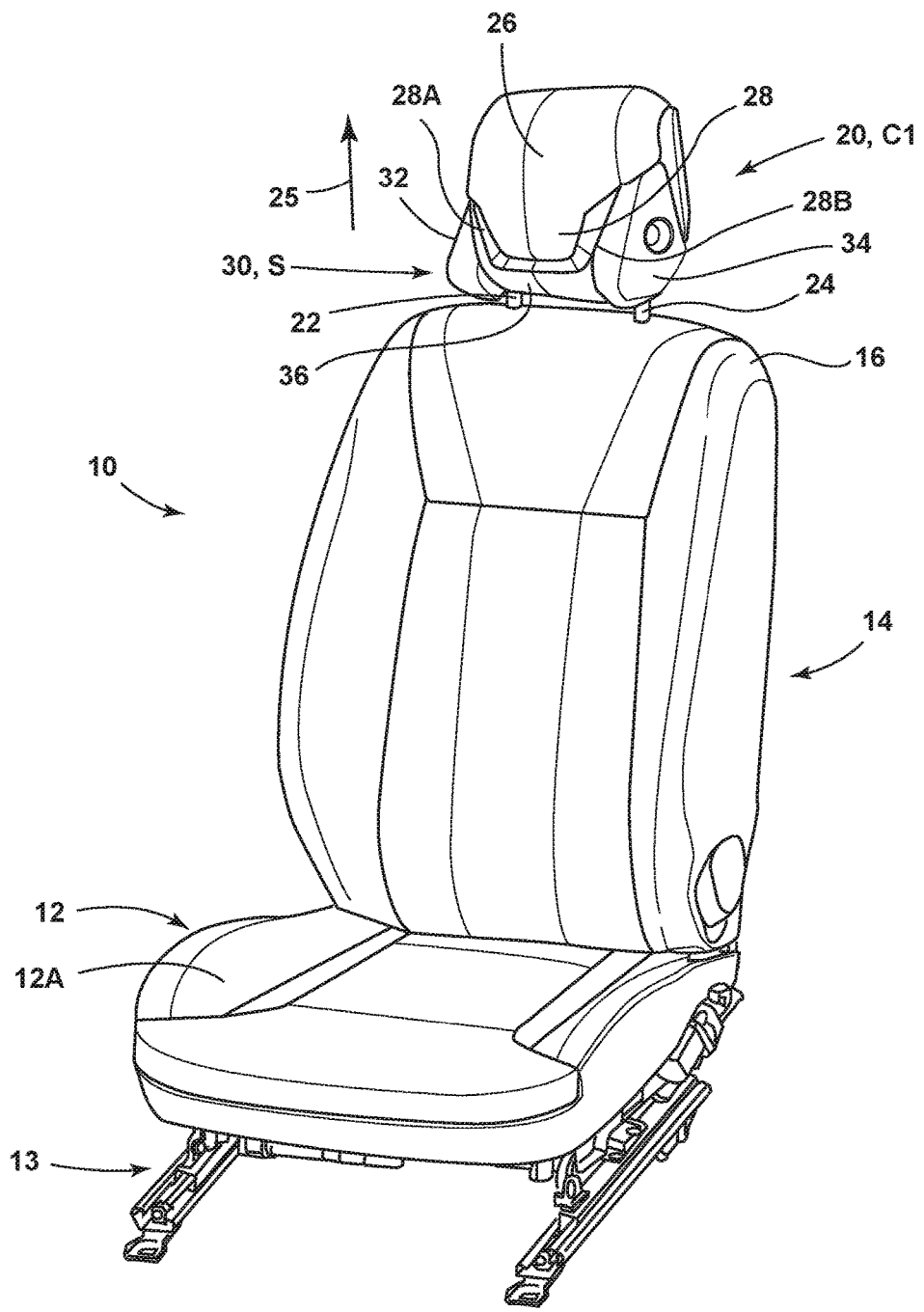
FIG. 1 is a front perspective view of a vehicle seat having a headrest according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a vehicle seat assembly as illustrated in accordance with an embodiment of the present invention. The vehicle seat 10 may be a driver's seat, or any other passenger seat, such as a first row seat, a second row seat or any subsequent row seat. The vehicle seat 10 includes a seat portion 12 with a cushion member 12A for supporting a vehicle occupant thereupon. A track assembly 13 is coupled to the seat portion 12 and contemplated to be secured to a floor surface of a vehicle for moving the vehicle seat 10 between fore and aft positions. The vehicle seat 10 also includes a seatback 14 extending upwardly from a rear portion of the seat portion 12 for supporting a torso of the vehicle occupant. The seatback 14 includes an upper portion 16 having a headrest assembly 20 adjustably mounted thereto. The headrest assembly 20 is supported by first and second support struts 22, 24 slideably received in the seatback 14 at the upper portion 16 thereof. The first and second support struts 22, 24 are configured to adjustably move the headrest assembly 20 in a substantially vertical direction as indicated by arrow 25. In use, the seatback 14 is configured to supporting a head of a vehicle occupant when the vehicle occupant rests his or her head against the headrest assembly 20. Although an individual vehicle seat 10 is illustrated in the embodiment of FIG. 1, it is contemplated that any size vehicle seat 10 may be utilized, such as a bench seat, which may include one or more headrest assemblies.

As further shown in FIG. 1, the headrest assembly 20 includes a centrally disposed headrest bun 26 having a lower mounting portion 28. Disposed below the headrest bun 26, an adjustable neck support feature 30 is shown having first and second side portions 32, 34 interconnected by a middle portion 36 to define a generally U-shaped structure. The first and second side portions 32, 34 are coupled to opposed sides 28A, 28B of the lower mounting portion 28 of the headrest bun 26. The first and second side portions 32, 34 are adjustably coupled to the headrest bun 26 at the lower mounting portion 28, such that the neck support feature 30 is operable between stowed and deployed positions S, D in a pivoting manner, as further described below. Thus, the headrest assembly 20 is contemplated to be a multi-configurational headrest assembly which is shown in FIG. 1 in a ground state or neutral configuration, wherein the neck support feature 30 is in the stowed position S. With the neck support assembly 30 in the stowed position S, a first configuration C1 of the headrest assembly 20 is defined. Conversion of the headrest assembly 20 from the first configuration C1 to a second configuration C2 providing enhanced neck support, will now be described with reference to FIGS. 2A-2B.

Figure 2A:
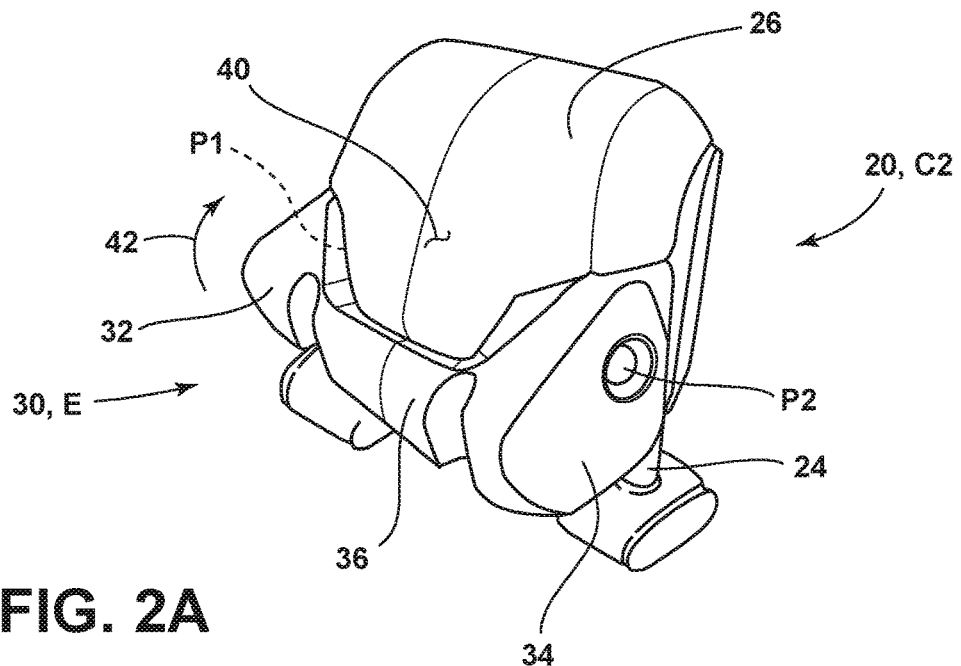
FIGS. 2A-2B are front perspective views of various headrest assemblies, showing relative movement between first and second configurations.
Figure 2B:
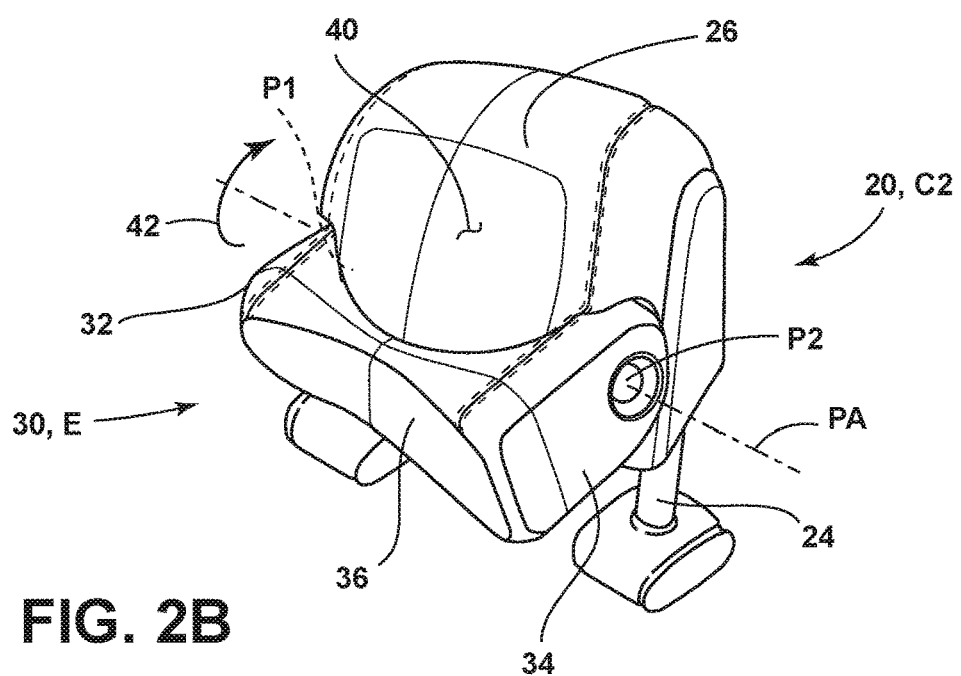

Referring now to FIGS. 2A and 2B, the headrest assembly 20 is shown in the second configuration C2 which is an enhanced support configuration with the neck support feature 30 pivoted outwardly to provide a cradle defining a head receiving area 40 for receiving the head of a passenger. As shown in the first configuration C1 of FIG. 1, the headrest assembly 20 provides for a generally uniform front facing contour with the neck support feature 30 positioned in a stowed configuration S relative to the headrest bun 26, such that the neck support feature 30 and the headrest bun 26 reside in a substantially common plane. Comparatively, as shown in FIGS. 2A and 2B, the neck support feature 30 is shown in a laterally extended position E, relative to the stowed position S shown in FIG. 1. In the extended position E, the neck support feature 30 has rotated or pivoted relative to the headrest bun 26 in a substantially car-forward and rotational direction as indicated by arrow 42 to laterally displace the neck support feature 30 relative to the headrest bun 26 to define second configuration C2. As moved to the extended position E, the neck support feature 30 is configured to provide support for a neck of a vehicle occupant, while the headrest bun 26 provides support for the back of a vehicle occupant's head. This is due to the stepped or shoulder relationship of the neck support feature 30 and the headrest bun 26 shown in FIGS. 2A and 2B. It is contemplated that the headrest bun 26 is a stationary member that does not move as the headrest assembly 20 adjusts between first and second configurations C1, C2. The neck support feature 30 is contemplated to be coupled to the headrest bun at pivot locations P1, P2 at first and second side portions 32, 34 for rotation about pivot axis PA as shown in FIG. 2B.

Figure 3A:
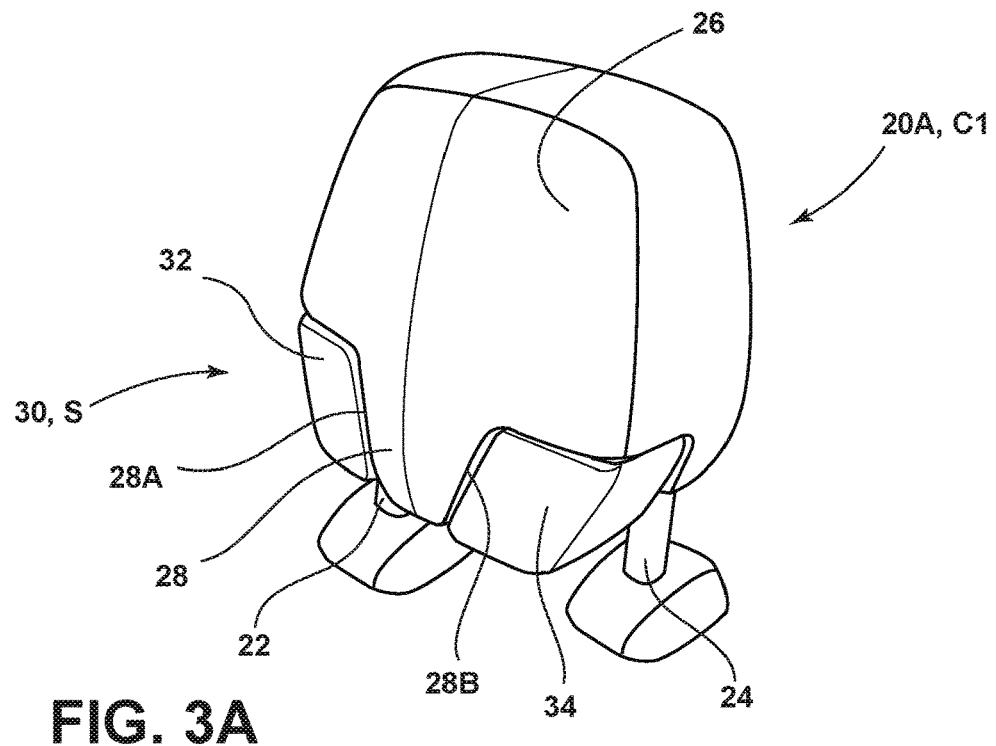
FIG. 3A is a front perspective view of a headrest assembly in a first configuration.
Figure 3B:
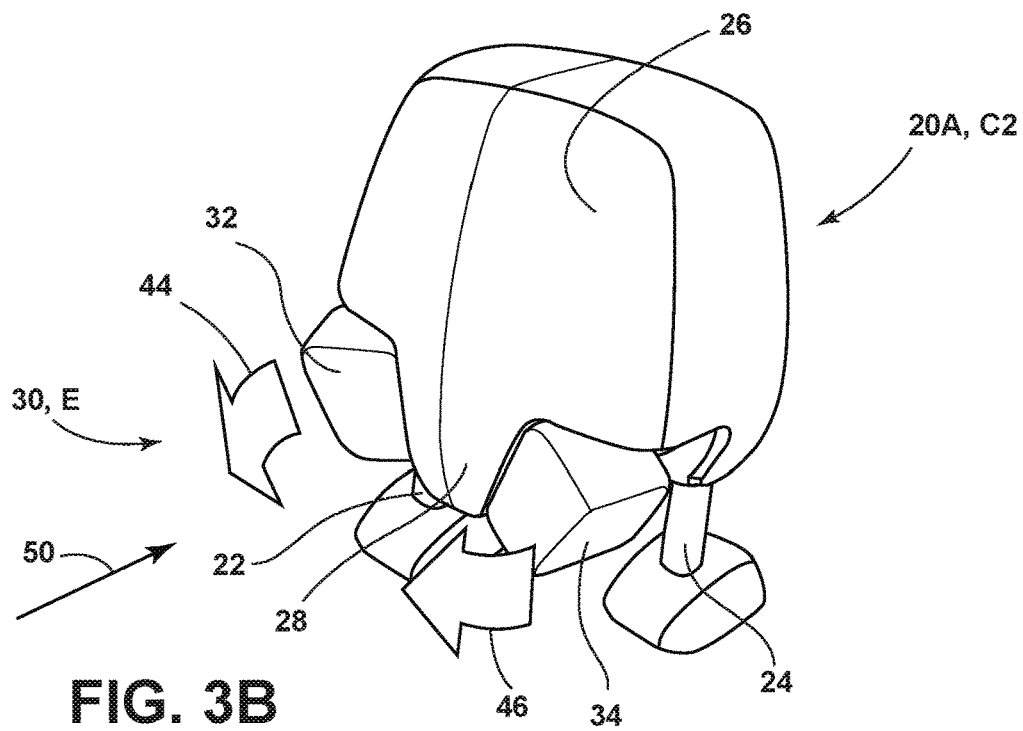
FIG. 3B is a front perspective view of the headrest assembly of FIG. 3A in a second configuration.

Referring now to FIGS. 3A and 3B, another embodiment of the headrest assembly 20A is shown in the first and second configurations C1, C2, respectively. In the first configuration C1, the headrest assembly 20A is shown having the neck support feature 30 in the stowed position S. The neck support feature 30 includes first and second side supports 32, 34 which are disposed on opposite sides 28A, 28B of the lower portion 28 of the headrest bun 26. In the stowed position S, the first and second side supports 32, 34 are disposed in a generally common plane (CP) defined by a front surface 27 of the headrest bun 26. The first and second side supports 32, 34 are configured to pivot or rotate outwardly from the stowed position S to the extended position E as shown in FIG. 3B along the path as indicated by arrows 44, 46, respectively. In the extended position E, the first and second side supports 32, 34 are configured to provide enhanced neck support for a vehicle occupant. In the embodiment shown in FIGS. 3A and 3B, the neck support feature 30 does not include an interconnecting member, such as middle portion 36 shown above with reference to FIGS. 1-2B. In the embodiment shown in FIGS. 3A and 3B, the neck support feature 30 includes separately articulating side support portions 32, 34 which can independently be moved between the stowed and extended positions as shown in FIGS. 3A and 3B, respectively. In the extended position E, the first and second side supports 32, 34 are disposed on opposite sides of a head receiving area 40. The neck support features of the present concept are contemplated to include friction hinges which are coupled to the side supports or side parts of the neck support feature 30.

Figure 4A:
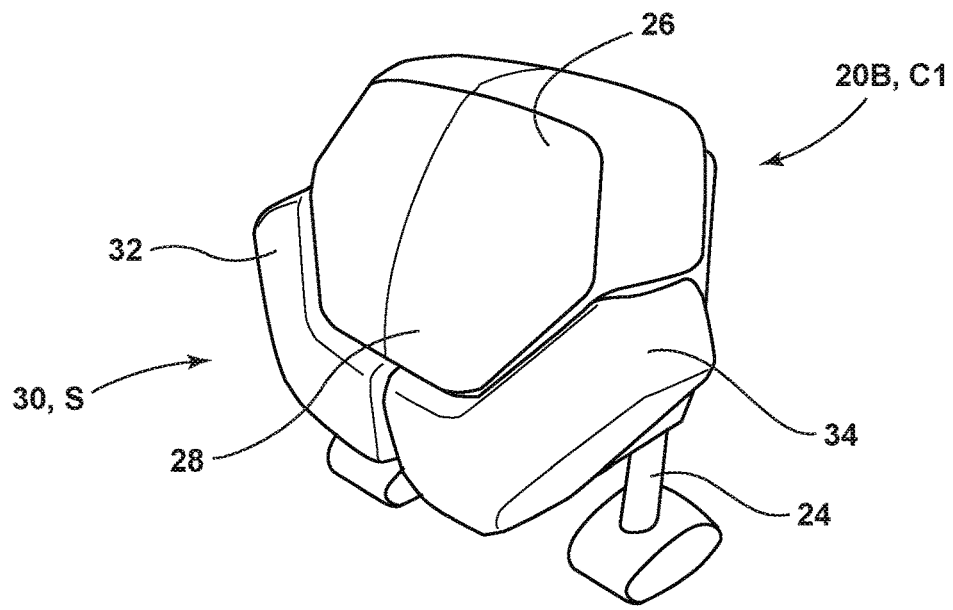
FIG. 4A is a front perspective view of a headrest assembly in a first configuration.
Figure 4B:
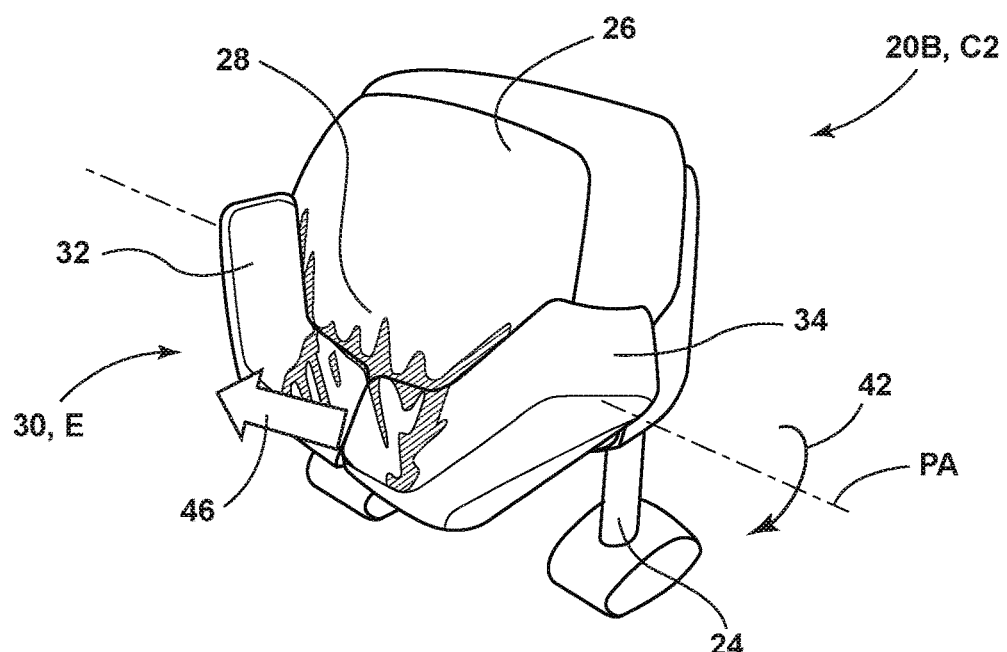
FIG. 4B is a front perspective view of the headrest assembly of FIG. 4A in a second configuration.

Referring now to FIGS. 4A and 4B, another embodiment of the headrest assembly 20B is shown in the first and second configurations C1, C2, respectively. In the first configuration C1, the headrest assembly 20B is shown having the neck support feature 30 in the stowed position S. The neck support feature 30 includes first and second side supports 32, 34 which are disposed around the lower portion 28 of the headrest bun 26. The first and second side supports 32, 34 are configured to pivot or rotate outwardly from the stowed position S to the extended position E as shown in FIG. 4B along the rotational path as indicated by arrow 42. In the extended position E, the first and second side supports 32, 34 are configured to provide enhanced neck support for a vehicle occupant having moved forward in the direction as indicated by arrow 46. In the embodiment shown in FIGS. 4A and 4B, the neck support feature 30 includes side support portions 32, 34 which can be independently articulating side support portions 32, 34, or which can be operably coupled to one another at seam 48 to be moved between the stowed and extended positions S, E, as shown in FIGS. 4A and 4B, in a simultaneous manner. The friction hinges used with the present concept will now be described with reference to FIGS. 5 and 6.

Figure 5:
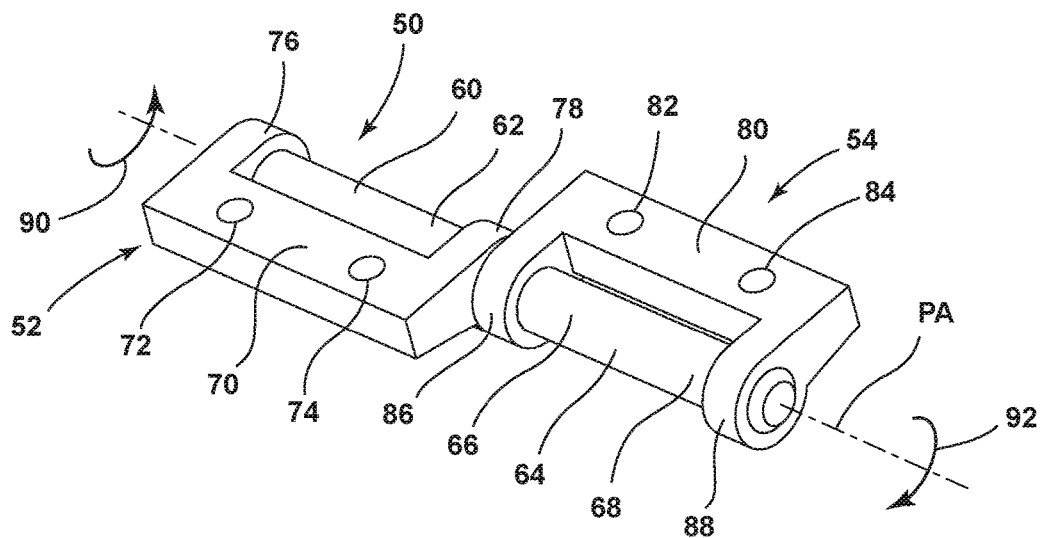
FIG. 5 is a perspective view of a hinge member, showing relative motion of first and second portions of the hinge member.
Figure 7:
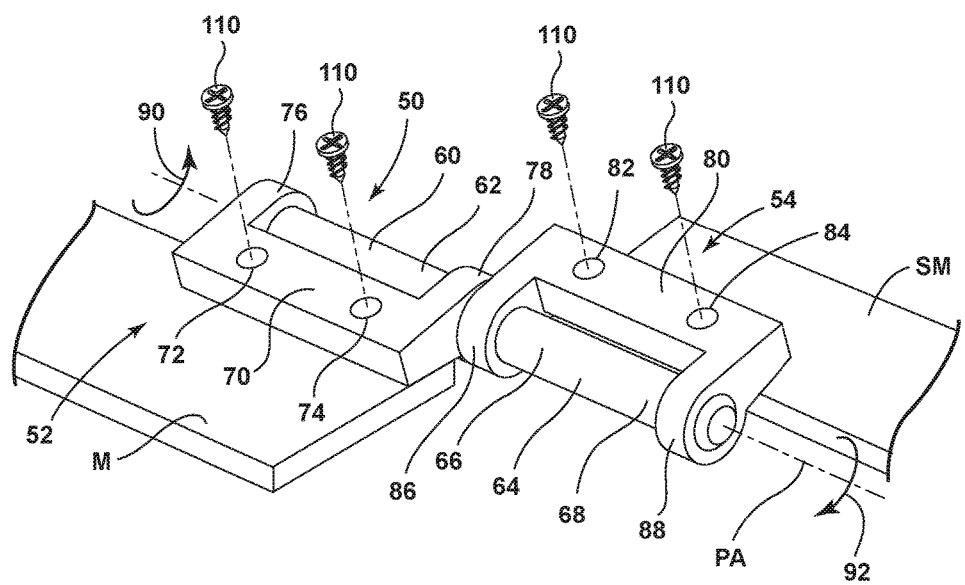
FIG. 7 is a perspective view of the hinge member of FIG. 5 with the first portion coupled to a frame member and the second portion coupled to a structural member.
Figure 8A:
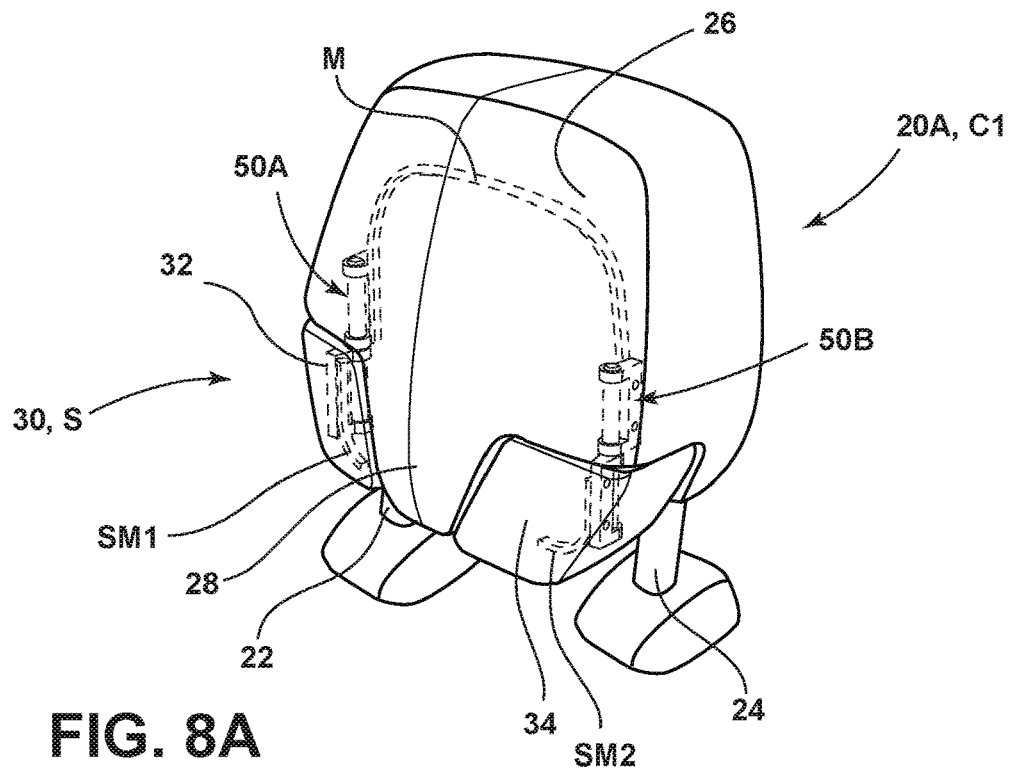
FIG. 8A is a front perspective view of the headrest assembly of FIG. 3A showing first and second hinge members coupled to the headrest bun and the first and second side supports.

Referring now to FIG. 5, a hinge member 50 is shown having a first portion 52 and a second portion 54 that are configured to rotate relative to each other. The relative rotation of the first portion 52 and the second portion 54 is generally inhibited by internal resistance of the hinge member 50, which ultimately allows the side support portions 32, 34 of the neck support feature 30 to be pivoted to the extended position E (FIG. 3B), and further to be retained in the extended position E. Thus, the hinge member 50 is contemplated to be a friction hinge, wherein the side support portions 32, 34 can rotate to any intermediate position disposed between the stowed position S (FIG. 3A) and the extended position E (FIG. 3B) and retain placement in such an intermediate position by the internal resistance of the friction hinge 50. Thus, the example hinge member 50 shown in FIG. 5 is used to pivotally couple the side portions 32, 34 of the neck support feature 30 to a portion of an internal frame (M as shown in FIGS. 7 and 8A) disposed within an interior of the headrest assembly 20. Hinge member 50 may be akin to a friction hinge used on a laptop computer to pivotally move a display screen to various positions and further retaining the screen in a desired position relative to a keyboard.

With further reference to FIG. 5, the first portion 52 and the second portion 54 are operably coupled to a hinge pin 60 having first and second sides 62, 64. The hinge pin 60 includes an outer surface 66 disposed over a generally cylindrical body portion 68. The first portion 52 of the hinge member 50 is shown in the embodiment of FIG. 5 as having a mounting portion 70 with mounting apertures 72, 74 disposed therethrough. First and second mounting arms 76, 78 extend outwardly from the mounting portion 70 for coupling the first portion 52 of the hinge member 50 to the first side 62 of the hinge pin 60. Similarly, the second portion 54 of the hinge member 50 is shown in the embodiment of FIG. 5 as having a mounting portion 80 with mounting apertures 82, 84 disposed therethrough. First and second mounting arms 86, 88 extend outwardly from the mounting portion 80 for coupling the second portion 54 of the hinge member 50 to the second side 64 of the hinge pin 60. Thus, as shown in FIG. 5, the first and second portions 52, 54 of the hinge member 50 are configured to pivot on the hinge pin 60 along the rotational paths indicated by arrows 90, 92 along a pivot axis PA which is defined by the hinge pin 60.

Figure 6:
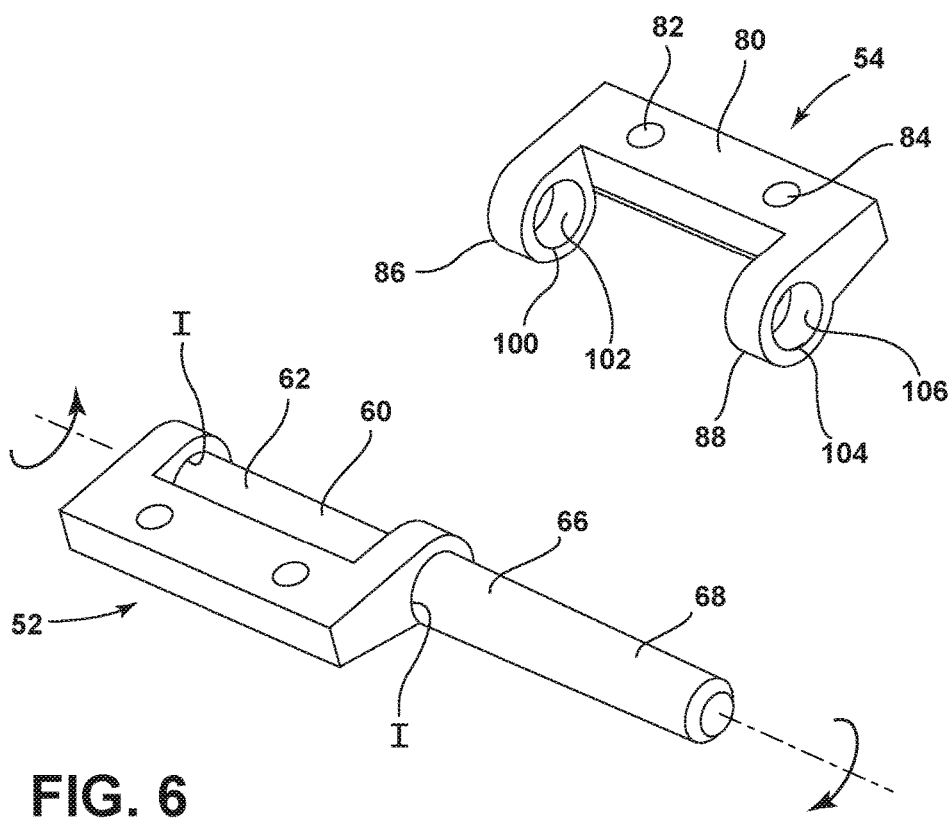
FIG. 6 is a perspective view of the hinge member of FIG. 5 with the second portion exploded away therefrom.

Referring now to FIG. 6, the hinge member 50 is shown having the second portion 54 exploded away from the hinge pin 60. In this view, first and second receiving apertures 100, 104 of the second portion 54 can be seen as disposed through the first and second mounting arms 86, 88. The first and second receiving apertures 100, 104 are configured to receive the hinge pin 60 in a frictional engagement as shown in FIG. 5. The first and second receiving apertures 100, 104 include interior engagement surfaces 102, 106, respectively, which are configured to engage the outer or exterior surface 66 of the hinge pin 60 to cause internal interference therebetween. Points of internal interference are shown in FIG. 6 at points I in the engagement of first portion 52 of the hinge member 50 and the first side 62 of the hinge pin 60. Thus, it is contemplated that the first portion 52 of the hinge member 50 includes similar receiving apertures as described above with reference to second portion 54.

It is contemplated that the internal interference between the first and second portions 52, 54 and the hinge pin 60 can be tuned to accommodate specific applications. For use in conjunction with the present concept, it is contemplated that the internal interference is in a range of approximately 50-200 N to ensure that the first and second side members 32, 34 will retract towards the stowed position S from the extended position E (or any intermediary position therebetween) during an impact event, wherein the head of a vehicle occupant may contact the first and second side members 32, 34 in a sudden manner. Such an impact event may include a rear-end collision event, wherein a vehicle occupant's head may suddenly contact the first and second side members 32, 34 of the headrest assembly 20 at a force sufficient to move the first and second side members 32, 34 towards the stowed position S. Such a force may be about 800-1000 N acting on the first and second side members 32, 34. Thus, with an internal interference in a range of approximately about 50-200 N, and more preferable about 70-100 N, the first and second side members 32, 34 will easily retract when impacted by a vehicle occupant during a collision event, but will have enough static force to remain in the deployed position for support as determined by the user. This generally equates to a static friction of about 100 N to get the first and second side members 32, 34 moving, and a required force of about 70 N to get the first and second side members 32, 34 once the first and second side members 32, 34 have started moving. Thus, a torque range for the first and second side members 32, 34 is about 8.0 Newton-Meters to about 60.0 Newton-Meters.

Referring now to FIG. 7, the first portion 52 and the second portion 54 of the hinge member 50 are shown operably coupled to the hinge pin 60 at first and second sides 62, 64, respectively. The first portion 52 is shown coupled to a frame member M via fasteners 110 as coupled to mounting apertures 72, 74 of the mounting portion 70 of the first portion 52. The frame member M is contemplated to be disposed within an interior of the headrest bun 26, as best shown below in FIG. 8A. The second portion 54 of the hinge member 50 is shown coupled to a structural member SM via the engagement of fasteners 110 with the mounting apertures 82, 84 of the mounting portion 80 of the second portion 54 of the hinge member 50. The structural member SM is contemplated to be disposed within an interior of one of the first and second side members 32, 34 to which the hinge member 50 is coupled. The structural member SM may be a plastic part that is flexible, and may include a foam covering for providing a cushioned effect to the first and second side supports 32, 34. The structural member SM may also be a rigid member disposed within the side supports 32, 34. The frame member M is contemplated to be a rigid member disposed within the headrest bun 26 of the headrest assembly 20. It is further contemplated that the first portion 52 of hinge member 50 may be fixedly coupled to the hinge pin 60, such that the second portion 54 of the hinge member 50 may be the only portion that rotates on the hinge pin 60 for moving the associated side member of the headrest assembly 20.

Figure 8B:
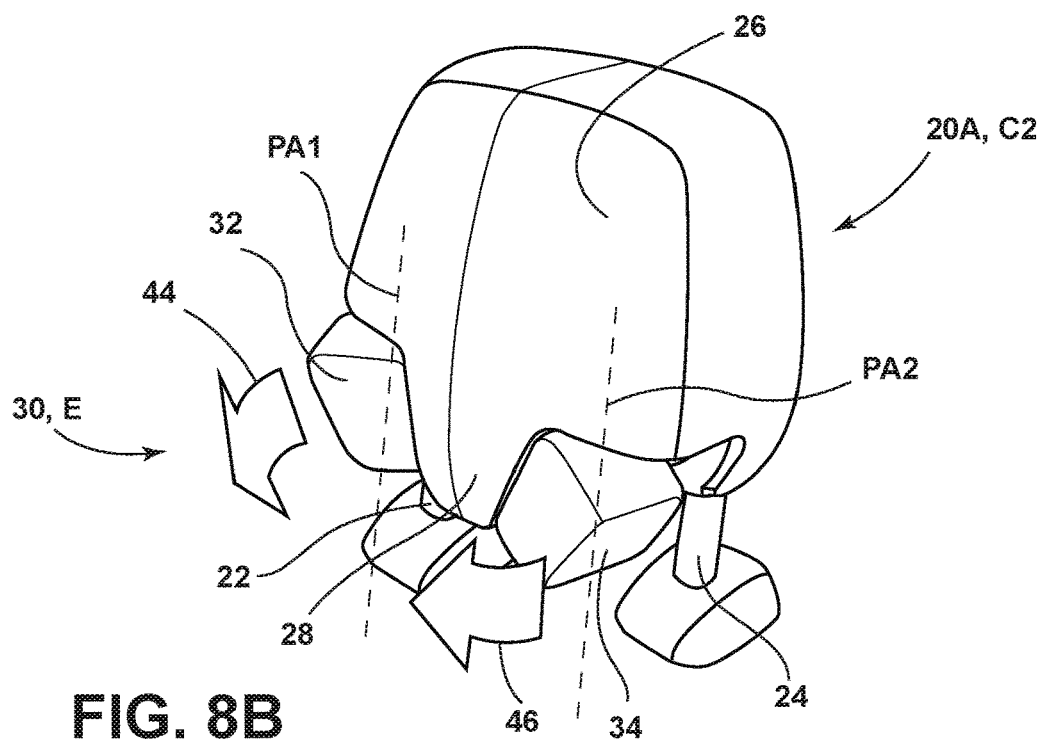
FIG. 8B is a front perspective view of the headrest assembly of FIG. 3B showing pivot axes for the first and second hinge members of FIG. 8A.

Referring now to FIG. 8A, the frame member M is shown disposed within an interior of the headrest bun 26 of the headrest assembly 20A. FIG. 8A includes a headrest assembly 20A akin to the headrest assembly 20A described above with reference to FIG. 3A. First and second hinge members 50A, 50B are shown coupled to the frame member M at opposite ends thereof, and further coupled to first and second structural members SM1, SM2 which are disposed in the first and second side supports 32, 34 for pivoting movement thereof. Thus, as shown in FIG. 8B, the first and second hinge members 50A, 50B (FIG. 8A) are disposed along vertical pivoting axis is PA1, PA2 for movement of the first and second side members 32, 34 to the extended positions E along the paths as indicated by arrows 44 and 46. Horizontal pivoting axes are also contemplated for use with the present concept, as shown, for example, in the embodiment of FIGS. 2A and 2B.

The friction hinge(s) used with the present concept may be similar to the SBI88 series hinges supplied by TorqMaster International of Stamford, Conn. One skilled in the art will appreciate, given the benefit of this disclosure, the application-specific requirements will direct the appropriate selection and implementation of the friction hinge(s), or any other suitable device, having the necessary internal resistance necessary to carry out the spirit of the invention.

Further, the relative movement and positioning of the side support members 32, 34 and may also be influenced by one or more other structures, such as a series of detents, springs, locks, "question mark" bands, reel clips, friction disks, nylon wraps and the like that provided various levels of internal interference of the hinge member 50 and restrain the first and second side support members 32, 34 in the extended position E, the stowed position S, or any intermediate position therebetween. The friction hinges are configured to retain the first and second side supports in the stowed position, the extended position and any intermediary position therebetween when rotated thereto and without outside forces acting on the first and second side supports.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A headrest assembly, comprising:
   a headrest bun;
   a friction hinge arranged on a vertical pivoting axis and having an upper portion disposed above a pivoting lower portion, the upper portion directly connected to an internal frame member disposed within a fixed upper portion of the headrest bun; and
   a side support coupled to the lower portion of the friction hinge below the fixed upper portion of the headrest bun, wherein the side support is configured to pivot between stowed and extended positions along the vertical axis.

2. The headrest assembly of claim 1, wherein the upper and lower portions of the friction hinge include vertically offset mounting portions, and further wherein the upper and lower portions are coupled to upper and lower sides of a hinge pin along an outer surface thereof.

3. The headrest assembly of claim 2, wherein the mounting portions include one or more mounting arms, wherein the mounting arms include receiving apertures therethrough which receive the hinge pin in assembly.

4. The headrest assembly of claim 3, wherein the receiving apertures of the mounting portions further include inner surfaces configured to engage the outer surface of the hinge pin to provide internal resistance therebetween.

5. The headrest assembly of claim 4, wherein the internal resistance of the inner surfaces and the outer surface of the hinge pin is in a range from about 70 N to about 100 N.

6. A headrest assembly, comprising:
   a headrest bun having a front surface, a bottom surface, a fixed upper portion, and a frame member disposed within an interior of the headrest bun;
   first and second hinge members coupled to opposite sides of the frame member, each of the first and second hinge members including a first portion directly connected to the frame member and a second portion vertically offset from the first portion and extending downwardly from the bottom surface of the headrest bun below the fixed upper portion; and
   first and second side supports directly connected to the second portions of the first and second hinge members, respectively, the first and second side supports being independently operable between stowed and extended positions below a portion of the bottom surface of the headrest bun, wherein the first and second side supports extended outwardly from the front surface of the headrest bun in the extended position, and further wherein the first and second hinge members are friction hinges configured to move the first and second side supports towards the stowed position when the first and second side supports are contacted by a vehicle occupant during a vehicle impact event.

7. The headrest assembly of claim 6, wherein the friction hinges are tuned to include an internal resistance of about 70 N to about 100 N with respect to movement of the first and second side supports between the stowed and extended positions.

8. The headrest assembly of claim 6, wherein the friction hinges are configured to retain the first and second side supports in the stowed position, the extended position and any intermediary position therebetween when rotated thereto and without outside forces acting on the first and second side supports.

* * * * *